(12) United States Patent
Lorenzo et al.

(10) Patent No.: US 9,165,134 B2
(45) Date of Patent: Oct. 20, 2015

(54) METHOD FOR PROVIDING AUTHORIZED ACCESS TO A SERVICE APPLICATION IN ORDER TO USE A PROTECTED RESOURCE OF AN END USER

(75) Inventors: Jorge Lorenzo, Madrid (ES); David Lozano, Madrid (ES); Diego Gonzalez, Madrid (ES); David Vicente, Madrid (ES)

(73) Assignee: Telefonica, S.A., Madrid (ES)

( * ) Notice: Subject to any disclaimer, the term of this patent is extended or adjusted under 35 U.S.C. 154(b) by 0 days.

(21) Appl. No.: 14/003,616

(22) PCT Filed: Nov. 4, 2011

(86) PCT No.: PCT/EP2011/005569
§ 371 (c)(1),
(2), (4) Date: Oct. 21, 2013

(87) PCT Pub. No.: WO2012/119620
PCT Pub. Date: Sep. 13, 2012

(65) Prior Publication Data
US 2014/0040993 A1    Feb. 6, 2014

Related U.S. Application Data

(60) Provisional application No. 61/450,376, filed on Mar. 8, 2011, provisional application No. 61/452,262, filed on Mar. 14, 2011.

(51) Int. Cl.
*G06F 7/04*      (2006.01)
*G06F 15/16*     (2006.01)
(Continued)

(52) U.S. Cl.
CPC .............. *G06F 21/45* (2013.01); *G06F 21/41* (2013.01); *G06F 21/6236* (2013.01); *H04L 63/10* (2013.01)

(58) Field of Classification Search
CPC ...... G06F 21/41; G06F 21/6236; G06F 21/45; H04L 63/10
USPC ............... 726/1, 2, 4, 5, 6, 7; 713/1, 166, 167
See application file for complete search history.

(56) References Cited

U.S. PATENT DOCUMENTS 8,473,749 B1 * 6/2013 Madsen et al. ............... 713/187
2007/0081518 A1 * 4/2007 Jain et al. ..................... 370/352
(Continued)

OTHER PUBLICATIONS

D. Balfanz, et al., "OpenID OAuth Extension", Jan. 7, 2009, 5 pages, XP55017510, URL:http://step2.googlecode.com/svn/spec/openid_oauth_extension/latest/openid_oauth_extension.html. Retrieved on Jan. 25, 2012.

(Continued)

*Primary Examiner* — Abu Sholeman
(74) *Attorney, Agent, or Firm* — Sughrue Mion, PLLC

(57) ABSTRACT

The protected resource, typically an API, is exposed by endpoints of a plurality of administrative domains. The endpoints are previously unknown by said service application and the method further comprises:
  i. using an intermediate or global entity for:
    a) selecting one of said administrative domains based on flexible criteria (i.e. at least on the identity of said end user but also considering varying user or service preferences); and
    b) performing, said selected administrative domain, a secure authorization to grant access to said end user by means of an open protocol;
and
  ii. providing, said selected administrative domain to said service application, once performed said secure authorization, direct or proxy access to said user's protected resource via the endpoint established by said intermediate entity.

12 Claims, 14 Drawing Sheets

(51) Int. Cl.
*G06F 21/45* (2013.01)
*G06F 21/41* (2013.01)
*G06F 21/62* (2013.01)
*H04L 29/06* (2006.01)

(56) References Cited

U.S. PATENT DOCUMENTS

| | | | |
|---|---|---|---|
| 2008/0016195 A1* | 1/2008 | Tulshibagwale et al. | 709/223 |
| 2011/0081008 A1* | 4/2011 | Lawson et al. | 379/114.03 |
| 2011/0283259 A1* | 11/2011 | Lawson et al. | 717/121 |
| 2012/0023556 A1* | 1/2012 | Schultz et al. | 726/4 |
| 2012/0124203 A1* | 5/2012 | Richards | 709/224 |
| 2012/0227087 A1* | 9/2012 | Brown et al. | 726/3 |
| 2012/0304265 A1* | 11/2012 | Richter et al. | 726/7 |
| 2012/0317624 A1* | 12/2012 | Monjas Llorente et al. | 726/4 |
| 2013/0014258 A1* | 1/2013 | Williams | 726/24 |
| 2013/0040729 A1* | 2/2013 | Griffin | 463/25 |
| 2013/0080911 A1* | 3/2013 | Klemm | 715/745 |
| 2013/0262586 A1* | 10/2013 | Chan et al. | 709/204 |
| 2013/0276069 A1* | 10/2013 | Roberson et al. | 726/4 |
| 2013/0324082 A1* | 12/2013 | Mohajeri | 455/411 |
| 2014/0004796 A1* | 1/2014 | Cakulev et al. | 455/41.2 |
| 2014/0032204 A1* | 1/2014 | Chan et al. | 709/204 |
| 2014/0033278 A1* | 1/2014 | Nimashakavi et al. | 726/4 |
| 2014/0040987 A1* | 2/2014 | Haugsnes | 726/3 |
| 2014/0040993 A1* | 2/2014 | Lorenzo et al. | 726/4 |
| 2014/0041055 A1* | 2/2014 | Shaffer et al. | 726/28 |
| 2014/0052548 A1* | 2/2014 | Dokken, Jr. | 705/14.73 |
| 2014/0059343 A1* | 2/2014 | Mohajeri et al. | 713/162 |
| 2014/0064467 A1* | 3/2014 | Lawson et al. | 379/114.03 |
| 2014/0082703 A1* | 3/2014 | Zhang | 726/4 |
| 2014/0108383 A1* | 4/2014 | Chan et al. | 707/722 |
| 2014/0181864 A1* | 6/2014 | Marshall et al. | 725/38 |
| 2014/0230023 A1* | 8/2014 | Parks | 726/4 |
| 2014/0280595 A1* | 9/2014 | Mani et al. | 709/204 |
| 2014/0282986 A1* | 9/2014 | Leung et al. | 726/9 |
| 2014/0372329 A1* | 12/2014 | Menon et al. | 705/319 |
| 2014/0380429 A1* | 12/2014 | Matsugashita | 726/4 |
| 2015/0046327 A1* | 2/2015 | Taupitz | 705/44 |

OTHER PUBLICATIONS

Openid.Net: "OpenID Authentication 2.0—Final", Dec. 5, 2007, pp. 1-34, XP55017217, URL:http://openid.net/specs/openid-authentication-2_0.html#http_encoding. Retrieved on Jan. 23, 2012.

E. Hammer-Lahav, et al. "The OAuth 2.0 Authorization Protocol; draft-ietf-oauth-v2-13.txt", Internet Engineering Task Force, IETF; Standardworkingdraft, Internet Society (ISOC) 4, Feb. 16, 2011, pp. 1-43, No. 13. Retrieved on Feb. 16, 2011.

Eric Sachs: "Google OAuth & Federated Login Research", Jan. 31, 2009, pp. 1-7, XP55017802, URL: http://web.archive.org/web/20090131114956/http://sites.google.com/site/oauthgoog/Overlap. Retrieved on Jan. 27, 2012.

* cited by examiner

METHOD FOR PROVIDING AUTHORIZED ACCESS TO A SERVICE APPLICATION IN ORDER TO USE A PROTECTED RESOURCE OF AN END USER

CROSS REFERENCE TO RELATED APPLICATIONS

This application is a National Stage of International Application No. PCT/EP2011/005569, filed on Nov. 4, 2011, which claims priority from U.S. Provisional Patent Application Nos. 61/450,376, filed on Mar. 8, 2011, and 61/452,262, filed on Mar. 14, 2011, the contents of all of which are incorporated herein by reference in their entirety.

FIELD OF THE ART

The present invention generally relates to a method for providing authorized access to a service application in order to use a protected resource of an end user, said protected resource typically being an API and being exposed by endpoints of a plurality of administrative domains, and said authorized access performed by means of an OAuth procedure, and more particularly to a method which comprises using an intermediate entity in order to route said OAuth procedure to the corresponding administrative domain, said administrative domain being the final issuer and controller of access authorizations, and providing, said administrative domain to said end user, a direct or proxy route in order to access to said API.

PRIOR STATE OF THE ART

In the last years the Internet world has experienced an explosion of web APIs/web services that open up service providers' functionalities to other sites and, in many cases, to individual developers, thus, allowing them to quickly build new services or enrich already existing ones through the inclusion and combination of remotely exposed functionalities. Nowadays, this is one of the major trends in the Internet and it is expected to keep growing and evolving, progressively addressing more sophisticated and dynamic scenarios.

Opening up APIs implies different issues that must be properly solved from a technical point of view in order to achieve really useful and suitable results. One of the main problems to be solved is security and, especially, end-user's privacy. Basically, Internet applications should only access service providers' functionalities after having correctly authenticated and after having received the explicit consent or authorization from the owner of the resources to be accessed, without the need for the resource owner (typically an end-user) to share his/her identity or credentials with the application. As a solution to this problem, the new OAuth standard has emerged in the last years and now the Internet community and IETF are working in the second version of this standard.

OAuth provides all the details to satisfactorily address static scenarios where API endpoints are known by applications before actually accessing the APIs and where all the APIs belong to the same service provider/administrative domain and, therefore, the access can be authorized and controlled from a single, central point. However, as the number of APIs grows in the Internet, there are new scenarios where the same API is exposed by different services providers or the same API is simply exposed from several locations by the same service provider, in order to improve the scalability and performance of the API exposure strategy.

The main current existing technologies are the OAuth 1.0 Protocol [1] that is standardized by the IETF and the OAuth 2.0 Protocol [2] which is under standardization process by the IETF.

Both OAuth 1.0 and 2.0 define an open protocol to allow secure API authorization in a simple and standard method from desktop and web applications, available both for Trusted and Non-Trusted Consumers (Clients). OAuth, as specified, is directly applicable to grant access to resources in REST services, but may also be used for example in SOAP-based web services.

The client, in order to access resources, it first has to obtain permission from the resource owner by means of the OAuth protocol. This permission is expressed in the form of a token and, optionally, a matching shared-secret. The purpose of the token is, as already explained, to make it unnecessary for the resource owner to share its credentials with the client. Unlike the resource owner credentials, tokens can be issued with a restricted scope and limited lifetime, and can be revoked independently.

In short, the main purpose of the OAuth protocol is to provide the means for the consumer to gain a valid Access-Token.

As it will be shown in FIG. 1, there are two tokens with crucial roles:

In the first place, Request Token is used as a reference within the delegated authorization procedures. More concretely, according to [1], Request Tokens are used by the Consumer to ask the User to authorize access to the Protected Resources. Then, the User-authorized Request Token, that is recommended to have a limited lifetime, is exchanged for an Access Token.

Finally, this Access Token is used by the Consumer to access the APIs on behalf of the User, instead of using the User's credentials (user and password). Access Tokens may limit access to certain APIs or even resources within a given API.

In OAuth 2.0, the Request Token concept disappears. Thus, the flow starts with the Authorization Request to the Service. In this request, instead of including the Request Token, the consumer identification is sent, as it will be shown in FIG. 2. There are several OAuth 2.0 scenarios:

Authorization code, as it will be shown in FIG. 2.

Implicit Grant: The implicit grant type is suitable for clients incapable of maintaining their client credentials confidential (for authenticating with the authorization server) such as client applications residing in a user-agent (e.g. browser)

Resource Owner password credentials: The resource owner password credentials grant type is suitable in cases where the resource owner has a trust relationship with the client, such as its computer operating system or a highly privileged application.

Client Credentials: The client can request an Access Token using only its client credentials when the client is requesting access to the protected resources under its control, or those of another resource owner which has been previously arranged with the authorization server (the method of which is beyond the scope of the OAuth 2.0 specification).

Basic OAuth is a widely used standard and there are many implementations, such as the offered by BlueVia [4], Twitter [5], Google [6] or Yahoo [7]. OAuth 2.0 is still a draft, but many implementations are already available or are in plans to offer OAuth 2.0; examples are Facebook [8] and Google [9].

Existing implementations warn about the fact that OAuth 2.0 is still a draft and therefore may have variations until its final standardization.

There are also several solutions that cover the scenario where a central OAuth Service provides the OAuth to Service Provider offering access to protected resources. This is the case of Google or Yahoo, which are providing OAuth to be used by any service in the internet.

In addition and covering the same scenario, Google has also provided a solution consisting on the union of OAuth and OpenID [10], [11]. With this solution, Google allows third-party web sites and applications to let their visitors signing in using their user Google accounts. As they explain, this extension is useful for web developers who use both OpenID and OAuth, particularly in that it simplifies the process for users by requesting their approval once instead of twice.

Unlike standard OAuth, the OpenID OAuth Extension does not provision request tokens in a server-to-server request from the Combined Consumer to the request token endpoint at the Combined Provider. Instead, the Combined Provider returns an already-approved request token to the Combined Consumer as part of the OpenID authentication response.

The Combined Consumer then exchanges the request token for an Access Token at the Access Token endpoint of the Combined Provider, following standard OAuth practice.

The common point of all of these solutions is that they cover the scenario where there is a central OAuth Service shared by all the service providers. In other words, the centralized solution is responsible of issuing the Access Tokens.

On another note, several solutions exist where the concept of 'token' is used with routing purposes. For example, CISCO and Microsoft [12] have a solution that uses routing token information to redirect client sessions to Microsoft Terminal Servers. Other examples are Microsoft usage of token redirection for Connection Broker [13] or TransNexus redirection solution for NexTransit™ signaling proxy [14].

However, none of these solutions are related with OAuth protocol, i.e.: the token used for routing is not an OAuth Access Token.

Regarding existing mechanisms for OAuth, as previously commented, there are solutions which cover two possible scenarios:

One Service Provider offering a protected resource implements OAuth to provide access to the protected resource. The own Service Provider offers the OAuth Service. This scenario matches with regular OAuth.

One OAuth Service providing OAuth for N Service Providers offering their owned Protected Resources. The Authentication and Token Issuing is done by the central OAuth Service. Thus, User credentials are central credentials provided by OAuth Central Service. This is the service offered by Yahoo and Google, for example.

In addition, Google offers a combination of OAuth with OpenID, for a more advanced and more flexible usage of second scenario.

In short, in existing solutions either the Service Provider offers the Authorization endpoint or there is a central Authorization endpoint that authenticates and issues the accessTokens for several Service Providers.

DESCRIPTION OF THE INVENTION

There is a need to count on distributed scenarios where API endpoints are not known in advance by the applications and where there is not a single entity that can be used as centralized controller for issuing authorizations and controlling its later use. With these requirements in mind, the objective of the invention proposed in this document is to provide a detailed solution for the application of OAuth to highly distributed and potentially evolving API exposure scenarios, without having to modify the OAuth standard in any way. To do so, instead of modifying the interfaces, the invention is focused on how to solve the problem within the API exposure infrastructure itself.

The following scenario, covered by this invention, is not correctly addressed by existing solutions:

Several Service Providers offering the same protected resource (i.e API). This typically occurs in telco environments, where several carriers offer a protected resource, such as the SMS operations.

As the Protected Resource is the same, an application that wants to access the protected resource implements OAuth and expects that one implementation will work with every service provider. The application may expect this even without knowing if the final user belongs to one Service Provider or the other.

The key point is that all Service Providers can offer a centralized shared OAuth Service, but each service provider needs to be responsible of User Authentication and Access Token issuing. A user belongs to a certain Service Provider, and user credentials cannot be known by a centralized OAuth service.

The present invention provides a method for providing authorized access to a service application in order to use a protected resource of an end user, said protected resource being exposed by endpoints of a plurality of administrative domains, each administrative domain within said plurality of administrative domains being responsible for issuing and controlling later use of authorizations to access to multiple protected resources as granted by end users belonging to said administrative domain On contrary to the known proposals, said endpoints are previously unknown by said service application and there is no centralized authorizations issuer/controller and the method of the invention, in a characteristic manner it further comprises, using an intermediate entity or global entity for:
 a) selecting an administrative domain of said plurality of administrative domains based on flexible criteria including at least identity of said end user; and
 b) performing said selected administrative domain, a secure authorization to grant access to said end user by means of an open protocol;
providing, said selected administrative domain to said end user, once performed said secure authorization, direct or proxy access to an endpoint included therein and to said protected resource, contained in said endpoint, via said service application.

Other embodiments of the method of the first aspect of the invention are described according to appended claims 2 to 19, and in a subsequent section related to the detailed description of several embodiments.

BRIEF DESCRIPTION OF THE DRAWINGS

The previous and other advantages and features will be more fully understood from the following detailed description of embodiments, with reference to the attached drawing, which must be considered in an illustrative and non-limiting manner, in which.

DETAILED DESCRIPTION OF SEVERAL EMBODIMENTS

Figure 1:
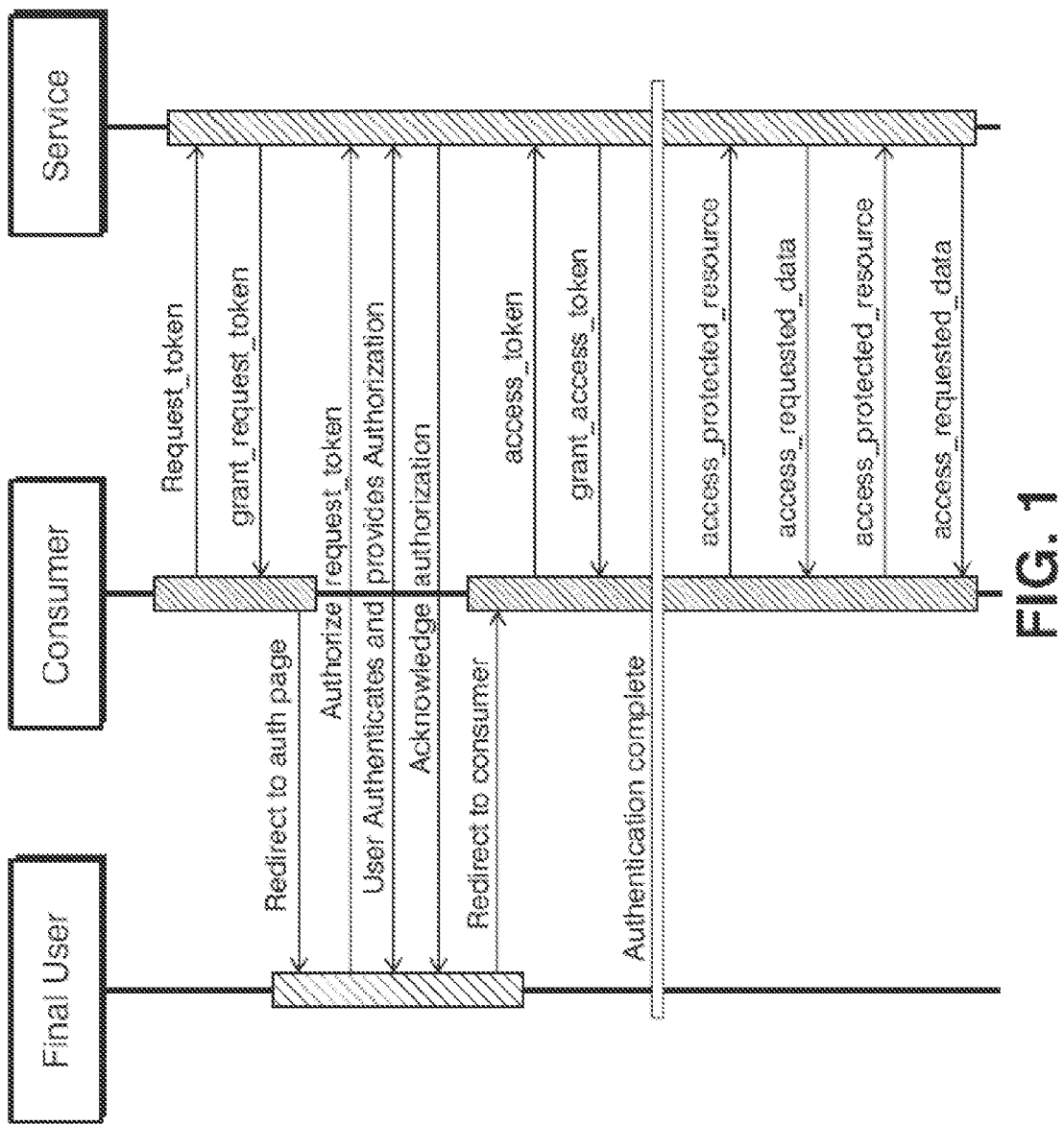
FIG. 1 shows current interactions followed by OAuth 1.0.
Figure 2:
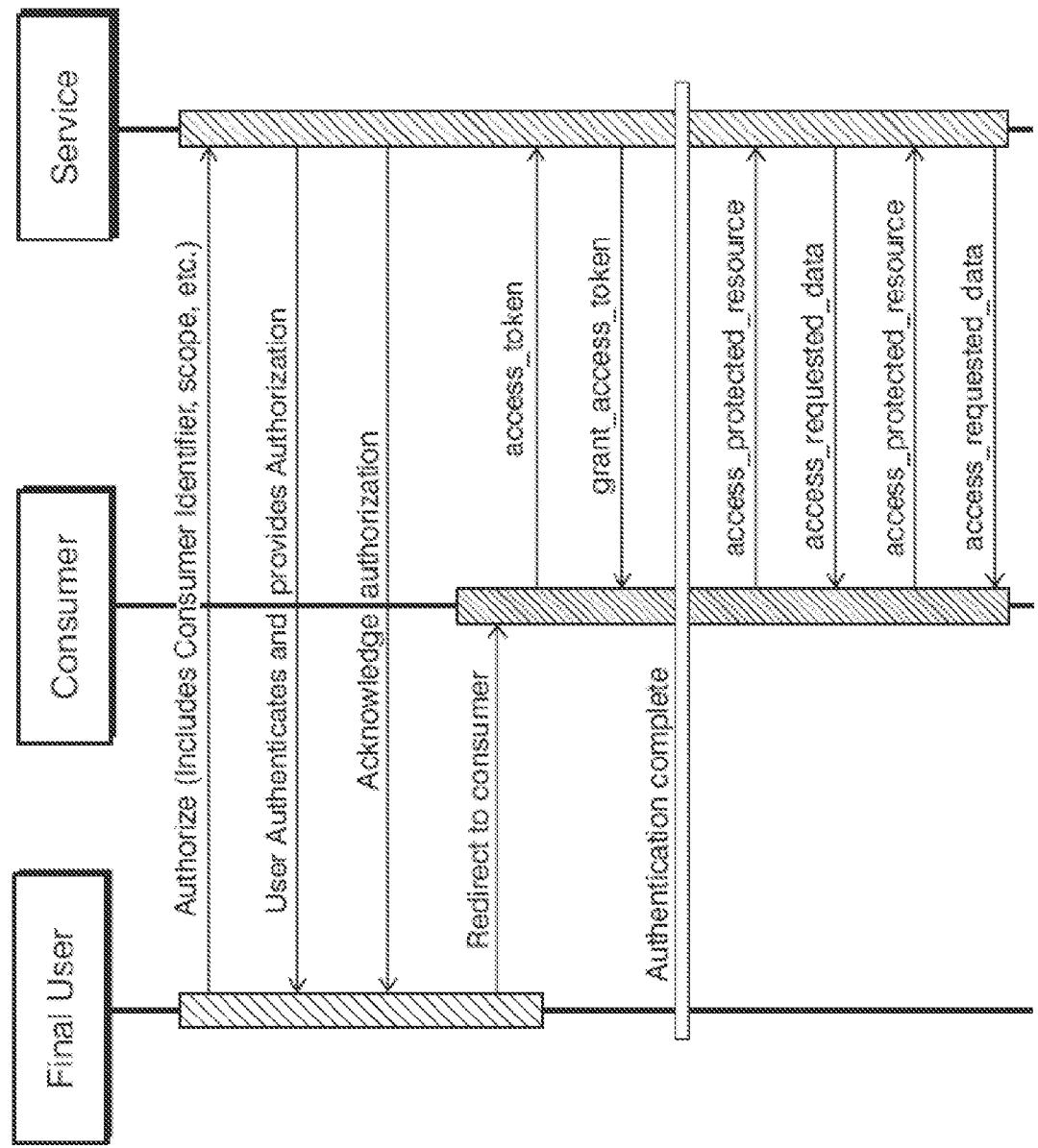
FIG. 2 shows current interactions followed by OAuth 2.0.
Figure 3:
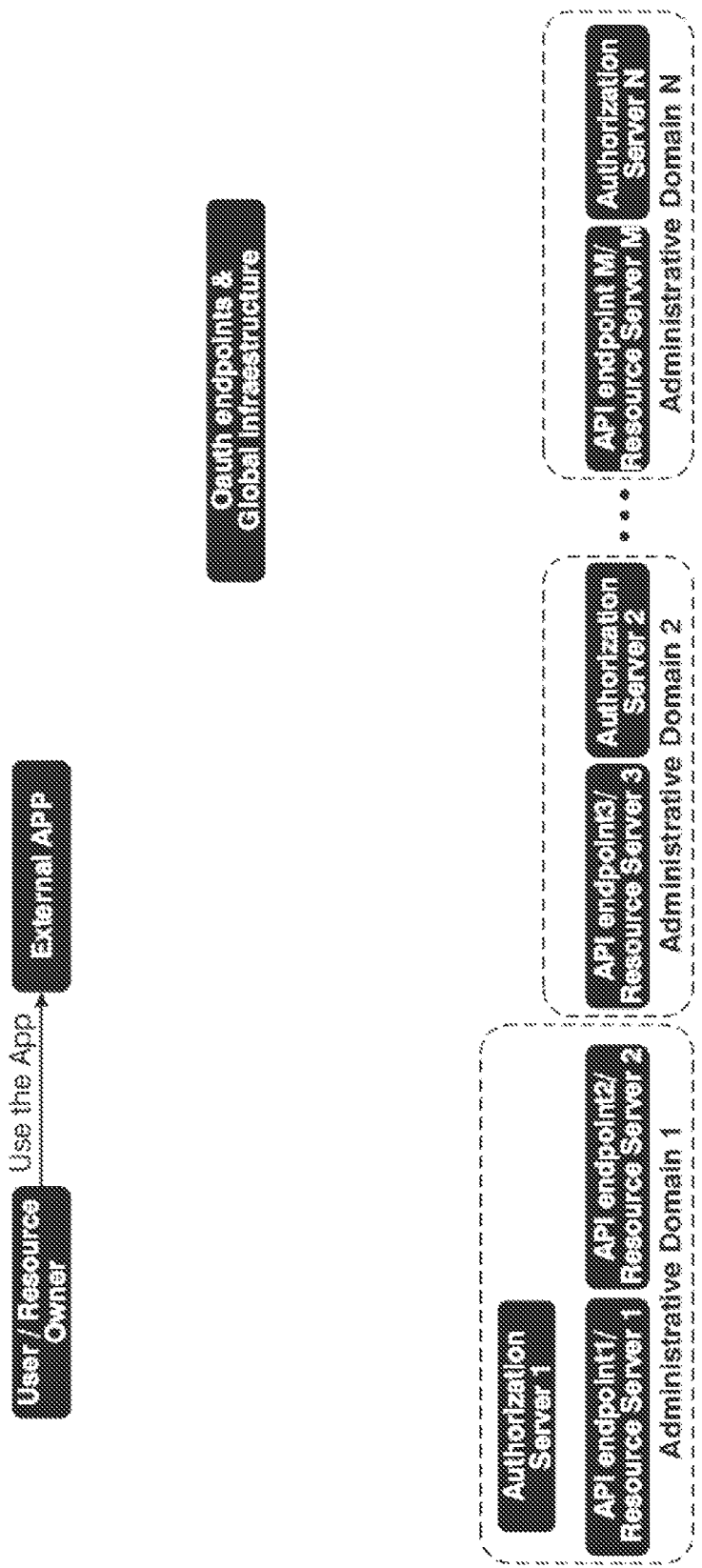
FIG. 3 shows a graphical representation of highly distributed and potentially evolving API exposure scenarios.
Figure 4:
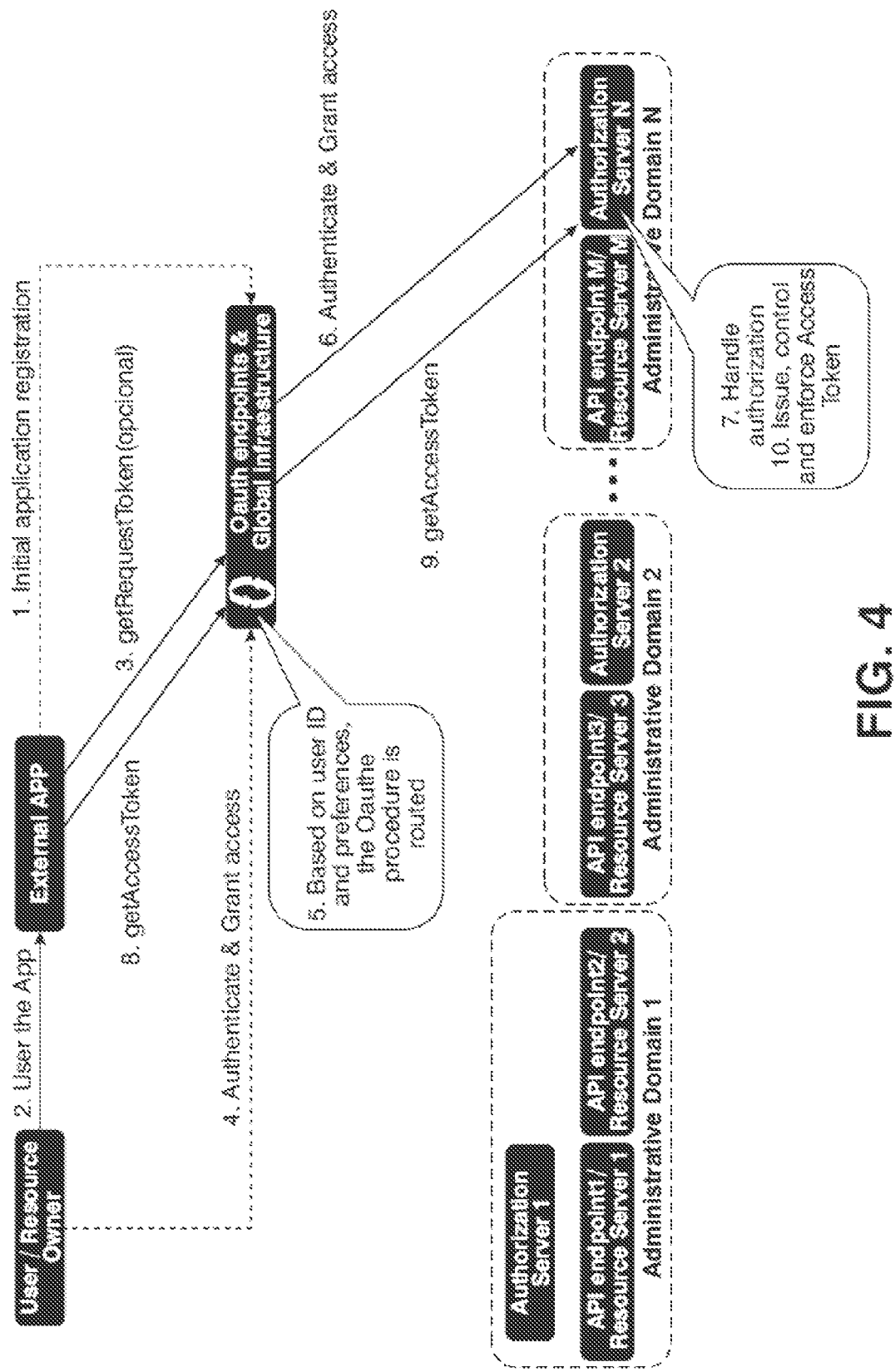
FIG. 4 shows the routing of the OAuth procedure according to an embodiment of the invention.

The present invention provides a solution for applying OAuth 1.0 and/or 2.0 to highly distributed and potentially evolving API exposure scenarios. According to the graphical representations of such scenarios, as shown in FIG. 3, the following requirements must be taken into consideration:

API endpoints (i.e the services or resources being exposed) are OAuth 1.0 or OAuth 2.0 compliant and do not have any knowledge of each other or any global infrastructure.

Each API endpoint belongs to an administrative domain that is responsible for locally controlling the access to the API endpoint. An administrative domain typically corresponds with a service provider, but one service provider may have multiple administrative domains.

External applications don't have any prior knowledge of the API endpoints or the administrative domain that they have to use for each final user.

API exposure points and administrative domains can change along time.

Firstly, since applications do not have any prior knowledge of the endpoints nor the administrative domains they have to contact, there needs to be static URLs where applications can initially trigger the OAuth process, therefore, OAuth protocol endpoints (URLs) are kept unique and valid for getting authorizations to access any of the underlying API endpoints. Additionally, as applications must be authenticated during the process, there must be a "global infrastructure" that supports application registration and credentials management. This provides an understandable mechanism for external consumers to register themselves and trigger the API access, without having to deal with the details of the underlying distributed architecture. The global infrastructure knows these details and hides them to external applications. It is out of the scope of the present invention to describe how the global infrastructure knows about local administrative domains and/or API endpoints, but in principle there are different alternatives (static configuration, dynamic registration procedures, etc). In any case, it is very important to remark that the global infrastructure is not used as a centralized intermediary to later control API usage; it is just used to support the two main concepts of the solution as explained in the following:

Routing the OAuth Procedure: There is no need to centrally control and enforce the access authorization, instead, the authorization must be directly handled and enforced by the local administrative domain to which the API belongs to. This allows local infrastructure to change without affecting the overall system and provides flexibility for each domain to apply its own access policies without having to mandatory follow global security policies. In order to make this possible, the OAuth process must be routed, following flexible criteria, to the appropriate administrative domain based on the resource owner's information and preferences provided during the OAuth authorization phase.

Routing criteria may vary from one scenario to another. For example, an obvious routing decision may be routing the OAuth process to the service provider that the user belongs to, but the present solution does not preclude other criteria to be used as best applicable for the target scenario. The key point is to flexibly route the OAuth process to the appropriate local administrative domain based on the resource owner's information and preferences.

Routing API requests: Once that the correct administrative domain (more specifically, the authorization server of that domain) has issued the authorization and the application has obtained the associated Access Token, API requests sent by the application can be routed based on that Access Token. In fact, in addition to being an identifier or a pointer to get the access scope and policies established during the authorization phase, the Access Token itself is also used as a pointer to the routing decision taken during the authorization phase. In this way, the global service infrastructure, which knows the Access Token since it acts as an intermediary for the OAuth procedures, provides a data base that associates each Access Token with the appropriate administrative domain and, optionally, the specific API endpoints that can be accessed with that token within the administrative domain.

Figure 5:
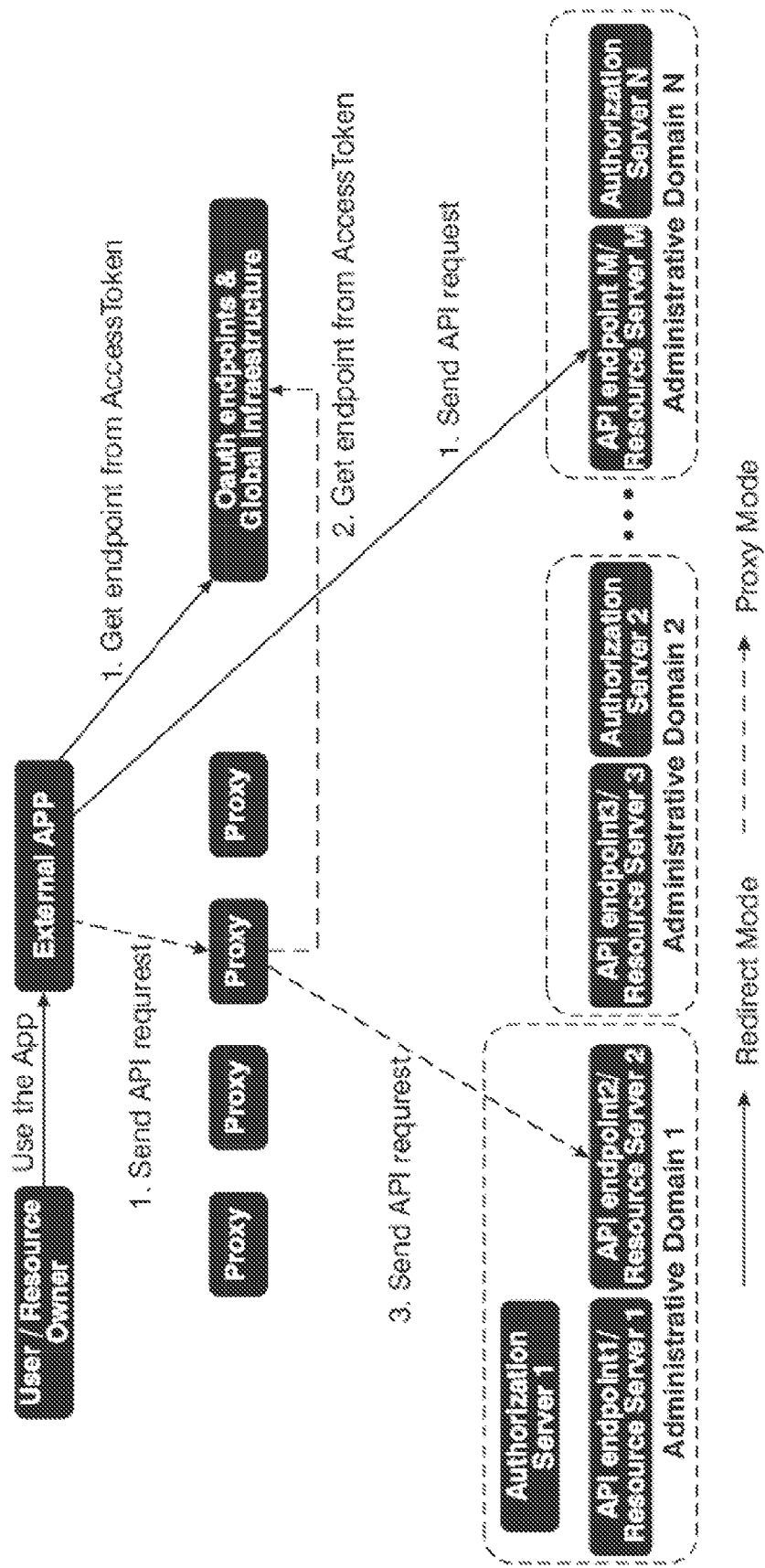
FIG. 5 shows the routing of the API requests according to an embodiment of the invention.

Based on this concept, as shown in FIG. 5, the access to the API endpoints can be distributed without relying on any centralized element, in either of the following two ways:

Redirect mode: before sending an API request, applications ask for the endpoint to be used for a given Access Token. The answer can be cached on the application side so that the query needs not be repeated again for later requests.

Proxy mode: a group of "API Proxies" may be distributed along the Internet. Applications send API requests to the nearest proxy without having to worry about the actual API endpoint to be used. When a request arrives at the proxy, the proxy extracts the Access Token and obtains the API endpoints associated to the Access Token by asking to the global infrastructure. Once it has the endpoint, it simply forwards the request to that endpoint. The endpoint associated to the Access Token can be cached by the Proxy to avoid having to ask again for later requests using the same token. How the application finds out which is the nearest proxy is out of the scope of the present invention.

Distributed OAuth provides a simple and efficient approach to authorize and consume a service on behalf of a user, where the novelty lies in targeting the authorization as well as the resource server (i.e. the API endpoint) as dynamically decided by a routing decision, for example, targeting the user's service provider (more exactly, the adequate administrative domain within the service provider). For the sake of simplicity, in the following detailed descriptions it will be assumed that this is always the applied routing decision, but as previously stated, there is freedom to apply other routing criteria when deemed adequate for the specific scenario.

To describe the details of the proposed invention in an understandable way, a sequential order is followed:

Firstly, providing a description of those procedures that need to take place first in real situations, this is: getting the authorization. The procedures for getting the authorization are further divided into two different alternatives:

1. Cases where all service providers/administrative domains use a common, global Authentication and Authorization portal for interacting with final users (note that authorization issuing and later control is still controlled by each administrative domain independently).
2. Cases where each service provider/administrative domain has its own, local Authentication and Authorization portal for interacting with final users.

Secondly, describing the procedures that allow routing API requests based on the Access Token obtained after completing the authorization phase.

Additionally, for OAuth 1.0 two parallel solutions are considered for each scenario: one assuming that the Request Token can be directly set towards the local service infrastructure, and another one considering that the above is not possible and Request Tokens are dynamically generated by the local service infrastructure on demand, following the standard OAuth 1.0 interface, which is fully exposed locally.

One Global Web Portal

Before consuming a protected resource, the application needs an Access Token which authorizes it to access to the resource on behalf of the user. This section considers a global web portal to interact with the final user in order to perform the authentication and authorization regardless of the underlying authorization server or the resource server associated to the user. This web portal may help to offer a unified user experience for every authorization and resource server. However, note that the authentication and authorization is actually performed by the local service infrastructure.

Figure 6:
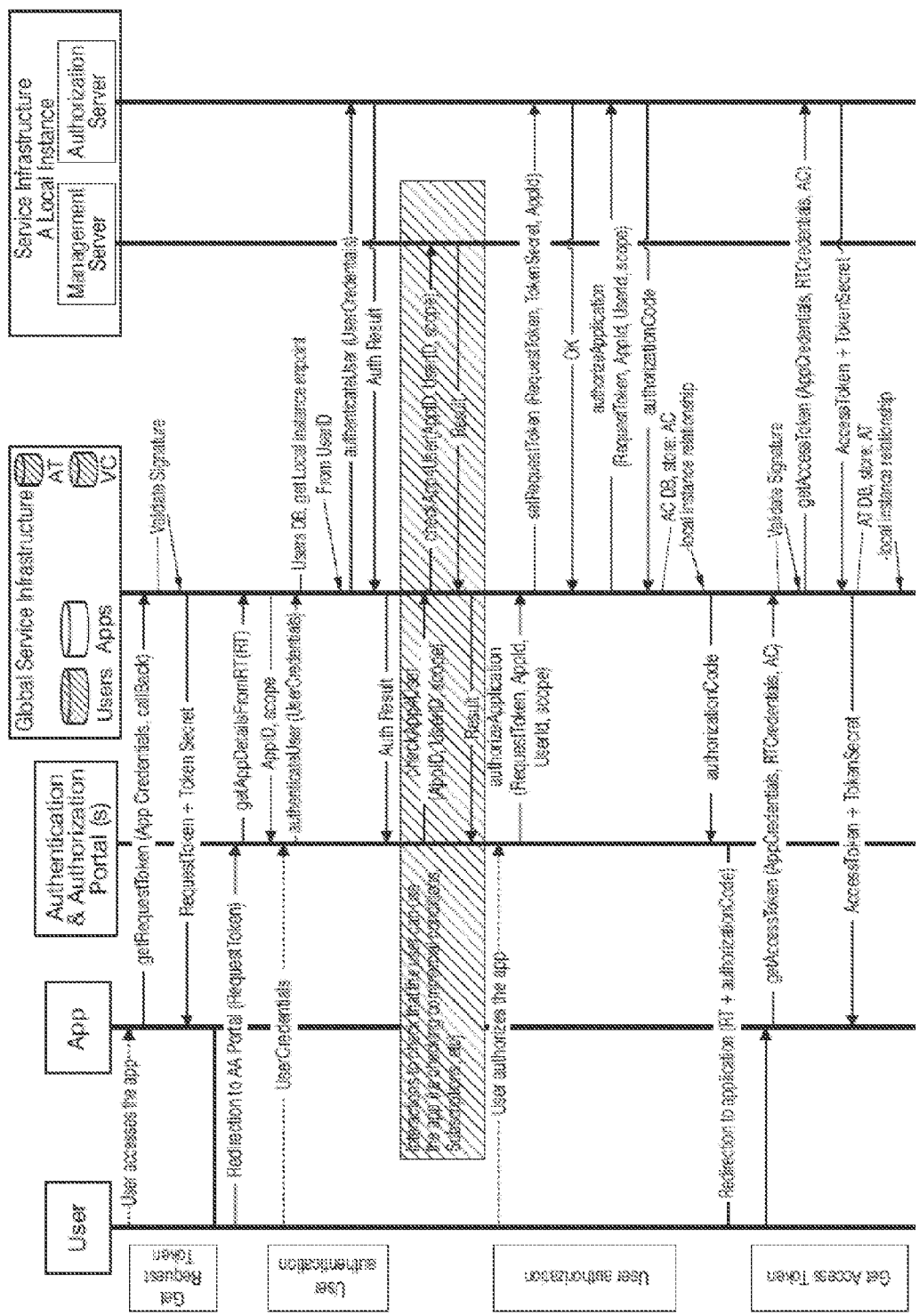
FIG. 6 shows the sequence to get an access token with OAuth 1.0 when request tokens can be directly set by the global service infrastructure and all the administrative domains share a common web portal, according to an embodiment of the invention.

As shown in FIG. 6, this process is divided into the following steps:

1. The user interacts with the application. The application needs user's authorization to access some protected resources.
2. The application gets a request token, from the global authorization server, because the application is not aware of the local service infrastructure associated to the user.
3. The user is redirected, with the request token, to the global web portal to authenticate and authorize the application. The request token is validated by the global infrastructure and the portal obtains the application identifier and the scope (which resources are demanded by the application).
4. The user authenticates in the global web portal. The username enables the global infrastructure to find out the local service infrastructure associated to the user (by means of a database that maps the username with the associated local service infrastructure. As commented previously, it is out of the scope of the present invention to describe how this local information is made available to the global infrastructure, but there are different alternatives such as using subscription approaches, data replication solutions, etc). The authentication request is propagated to the local service infrastructure associated to the user.
5. A set of interactions may happen between the global infrastructure and the local service infrastructure to set up the terms & conditions of the authorization. These interactions are out of the scope of the present invention.
6. The user authorizes the application to access some protected resources on his/her behalf under specific terms & conditions. The request token is stored in the local service infrastructure to adhere to the operation to the standard OAuth process. The local instance generates an authorization code, verification code in OAuth 1.0 terminology, which is cached in the global infrastructure to map an authorization code with the local service infrastructure. Note this step is actually a set of requirements for the local and the global infrastructure, but it does not impact on the OAuth public API, as the getRequestToken is in fact applied globally as described in step 2 of the present scenario, i.e. the external application always sees a standard OAuth access procedure.
7. The application receives the authorization code (or verification code) through an HTTP redirection (other mechanisms would be also feasible). The application requests an Access Token to the global service infrastructure which intermediates with the authorization server in the local service infrastructure which actually generates the Access Token (and token secret). The global infrastructure saves the mapping between the Access Token and the local service infrastructure which enables the global Access Token directory to route the requests to resources. Finally, the application gets the Access Token (and token secret) to consume the protected resources on behalf of the user.

Figure 7:
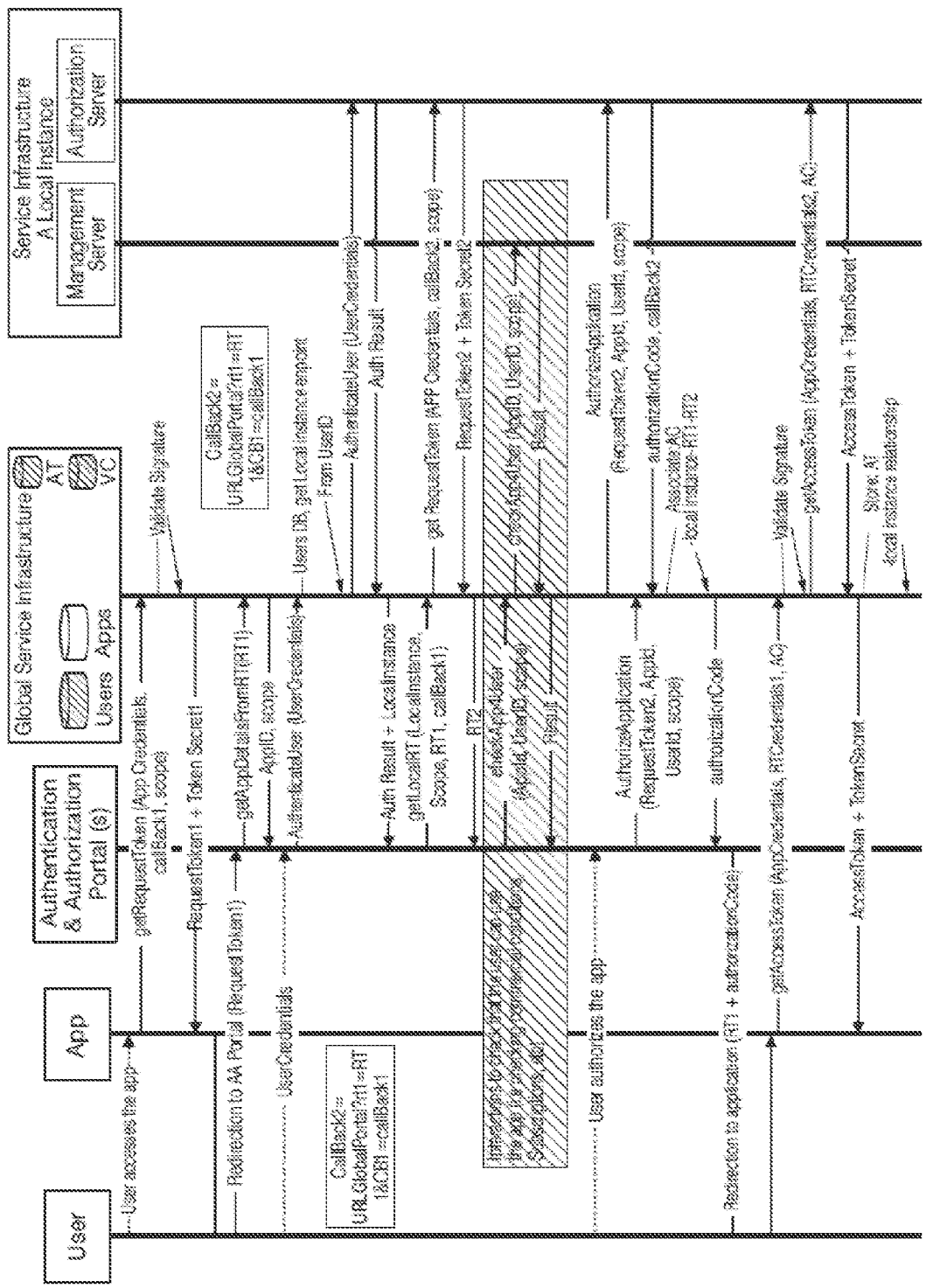
FIG. 7 shows the sequence to get an access token with OAuth 1.0 when request tokens are generated by the local infrastructure on demand and all the administrative domains share a common web portal, according to an embodiment of the invention.

In FIG. 7 it was depicted the above process for the case where request tokens are generated by the local infrastructure on demand. Within the flow CallBack2 is formed in the following way: AAPortalURL?rt1=RequestToken1&cb1=callBack1. This allows the AA portal to automatically recover the RequestToken1 and callBack1, which are to be used when coming back to the application once the authorization has been emitted.

Figure 8:
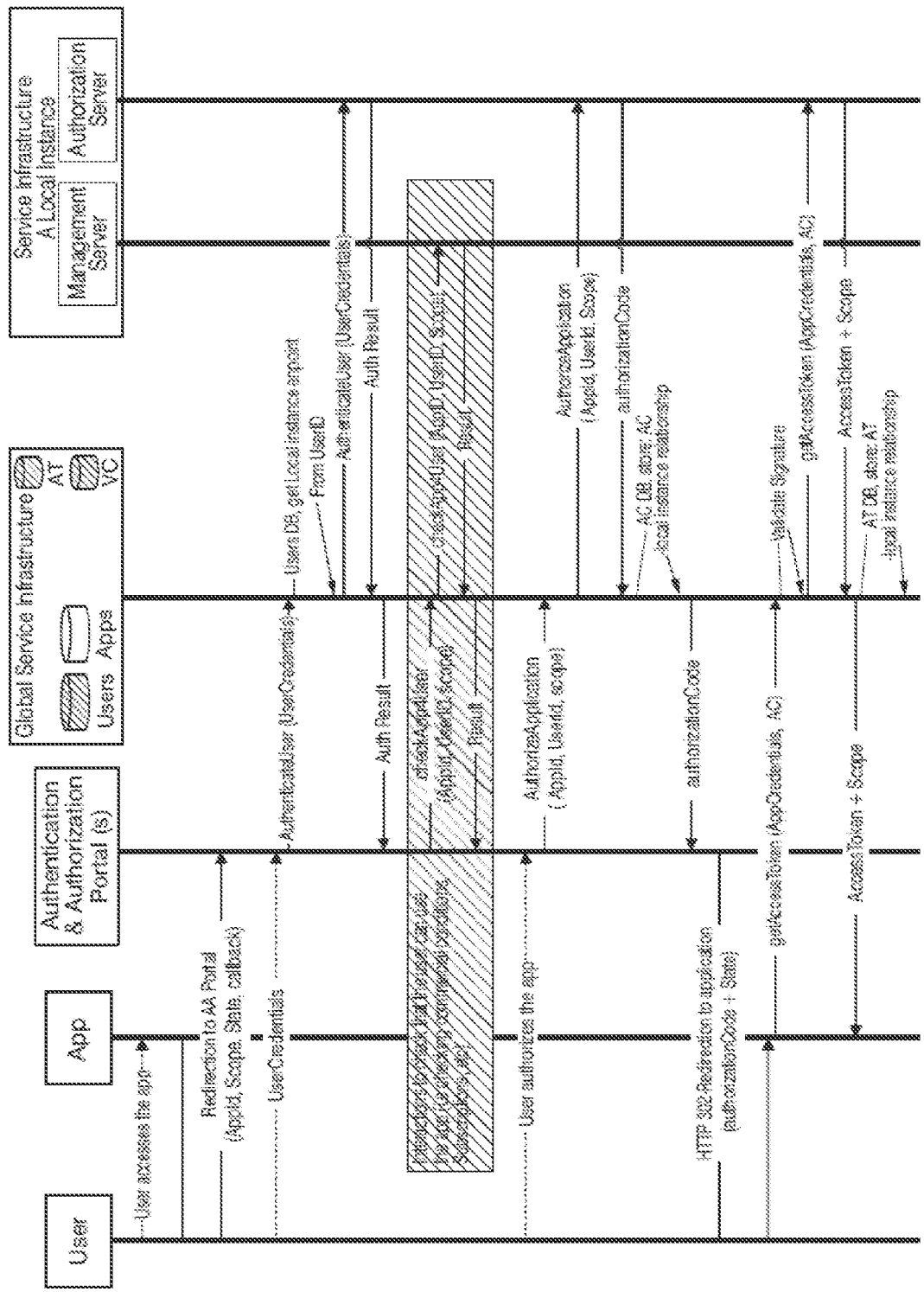
FIG. 8 shows the sequence to get an access token with OAuth 2.0, which does not require a request token, and all the administrative domains share a common web portal, according to an embodiment of the invention.

OAuth 2.0 simplifies the overall process because the application does not need a request token any more. The application also includes a scope, in the HTTP redirection for the authentication step, which specifies the resources the user should authorize, as shown in FIG. 8.

Distributed Local Web Portals

Figure 9:
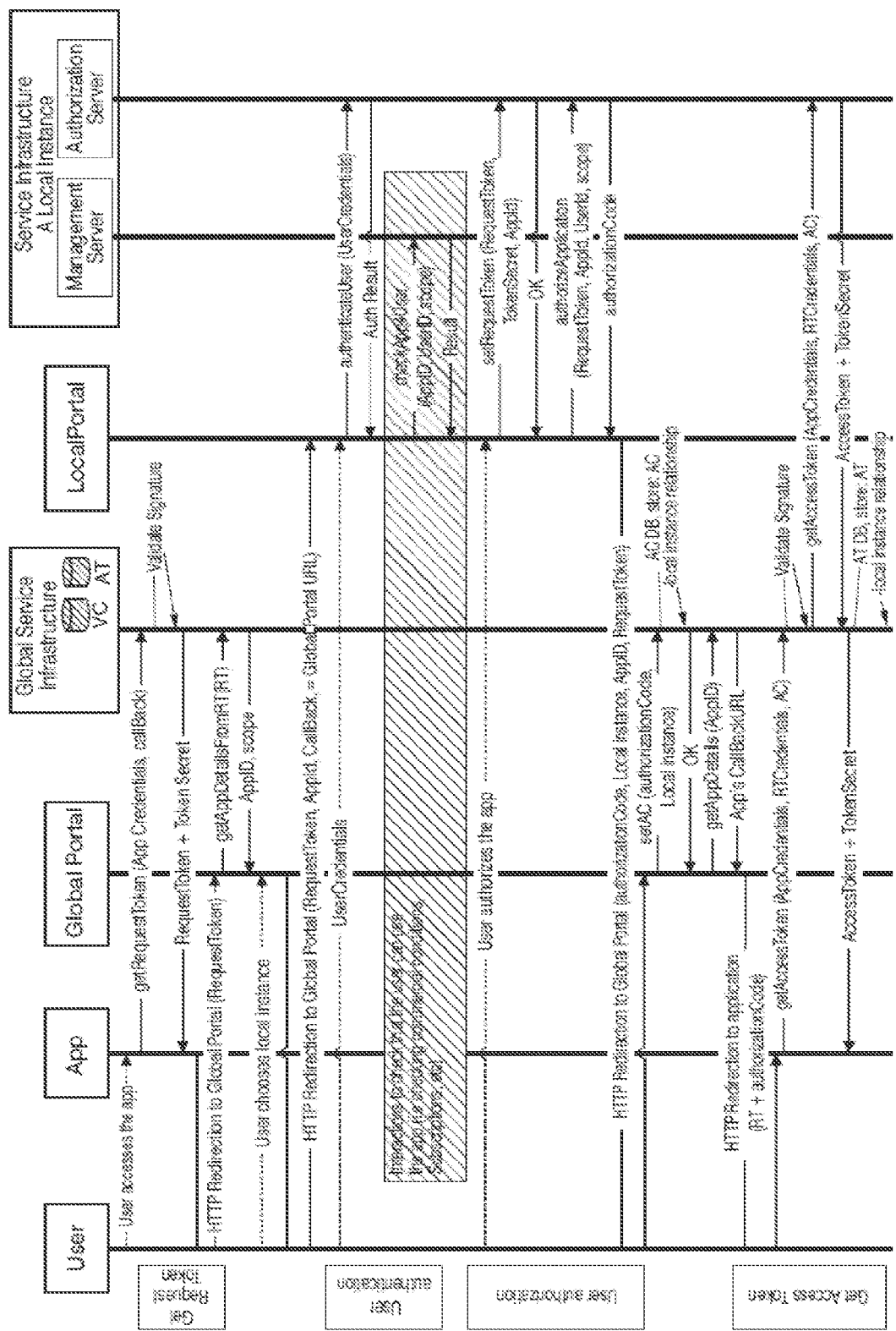
FIG. 9 shows the sequence to obtain the access token with OAuth 1.0 when request tokens can be directly set by the global service infrastructure and each administrative domain has its own local web portal, according to an embodiment of the invention.

In this case there is no global web portal to carry out the interactions with the end user in order to perform the authentication and authorization. Each local service infrastructure provides a web portal to perform both actions. Neither the authentication nor the authorization is intermediated by the global service infrastructure. As a result, an alternative approach is required to target the appropriate local service infrastructure. Several mechanisms might be used (e.g. by analysis of the user's IP address) to infer the local service infrastructure. This mechanism might be simplified by requesting the user to select it explicitly, as shown in FIG. 9, which describes the sequence to obtain the Access Token, assuming that request tokens can be directly set locally. This process is divided into the following steps:

1. The user interacts with the application. The application needs user's authorization to access some protected resources.
2. The application gets a request token, from the global authorization server, because the application is not aware of the local service infrastructure associated to the user.
3. The user is redirected, with the request token, to the global web portal. The request token is validated by the global infrastructure and the portal obtains the application identifier and the scope (which resources are demanded by the application).
4. The user selects the local service infrastructure (by clicking on a web page or by alternative mechanisms out of the scope of the present invention). The user is redirected, by HTTP, to the local web portal (according to the selection) and the application callback is replaced by a global service infrastructure URL in order to map the authorization code with the local service infrastructure.
5. The user authenticates in the local web portal.
6. A set of interactions may happen to set up the terms & conditions. These interactions are out of the scope of this document.
7. The user authorizes the application to access some protected resources on his/her behalf under specific terms & conditions. The request token is stored in the local service infrastructure to adhere to the operation to the standard OAuth process, but the token secret will be a pre-established value because it cannot be attached in the user's request. Finally, the local instance generates the authorization code, verification code in OAuth 1.0 terminology. Note this step is actually a set of requirements for the local infrastructure, but it does not impact on the OAuth public API, as the getRequestToken is in fact applied globally as described in step 2 of the present scenario, i.e. the external application always sees a standard OAuth access procedure.
8. The user is redirected to the global service infrastructure, with the request token and authorization code, so that a map between the authorization code and the local service infrastructure is cached in the global infrastructure. The application callback is obtained from the application details. The user is redirected to the application callback.
9. The application receives the authorization code (or verification code in OAuth 1.0 terminology) by the HTTP redirection (other mechanisms would be also feasible). The application requests an Access Token to the global service infrastructure which intermediates with the authorization server in the local service infrastructure in order to generate the Access Token (and token secret). The global infrastructure saves the mapping between the Access Token and the local service infrastructure which enables the global Access Token directory to route the requests to resources. Finally, the application gets the Access Token (and token secret) to consume the protected resources on behalf of the user.

Figure 10:
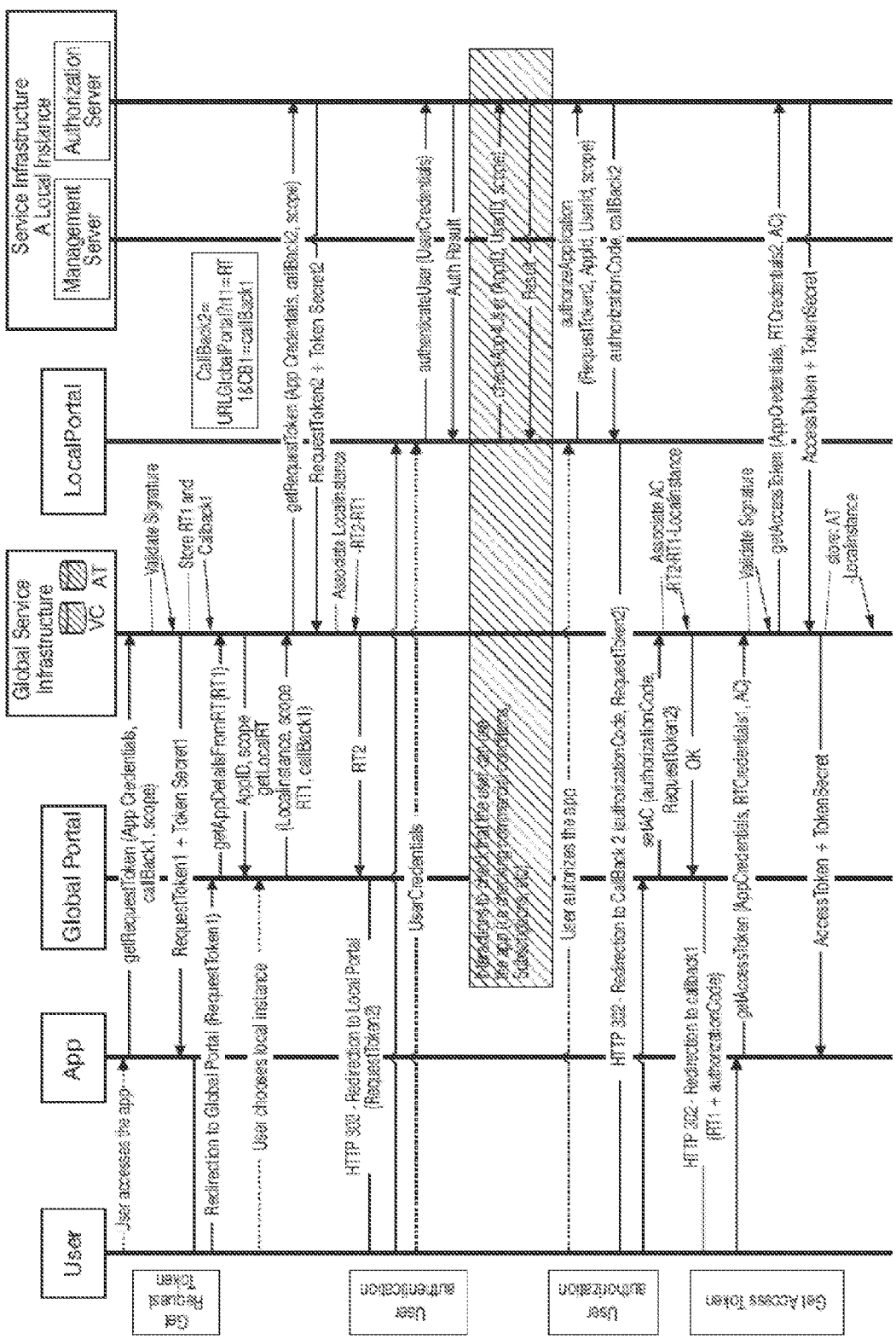
FIG. 10 shows the sequence to get the access token with OAuth 1.0 when request tokens are generated by the local infrastructure on demand and each administrative domain has its own local web portal, according to an embodiment of the invention.

In FIG. 10 it was depicted the above flow for the case where request tokens are generated by the local infrastructure on demand. Within the flow CallBack2 is formed in the following way:
GlobalPortalURL?rt1=RequestToken1&cb1=callBack1.
This allows the Global portal to automatically recover the RequestToken1 and callBack1, which are to be used when coming back to the application once the authorization has been emitted.

Figure 11:
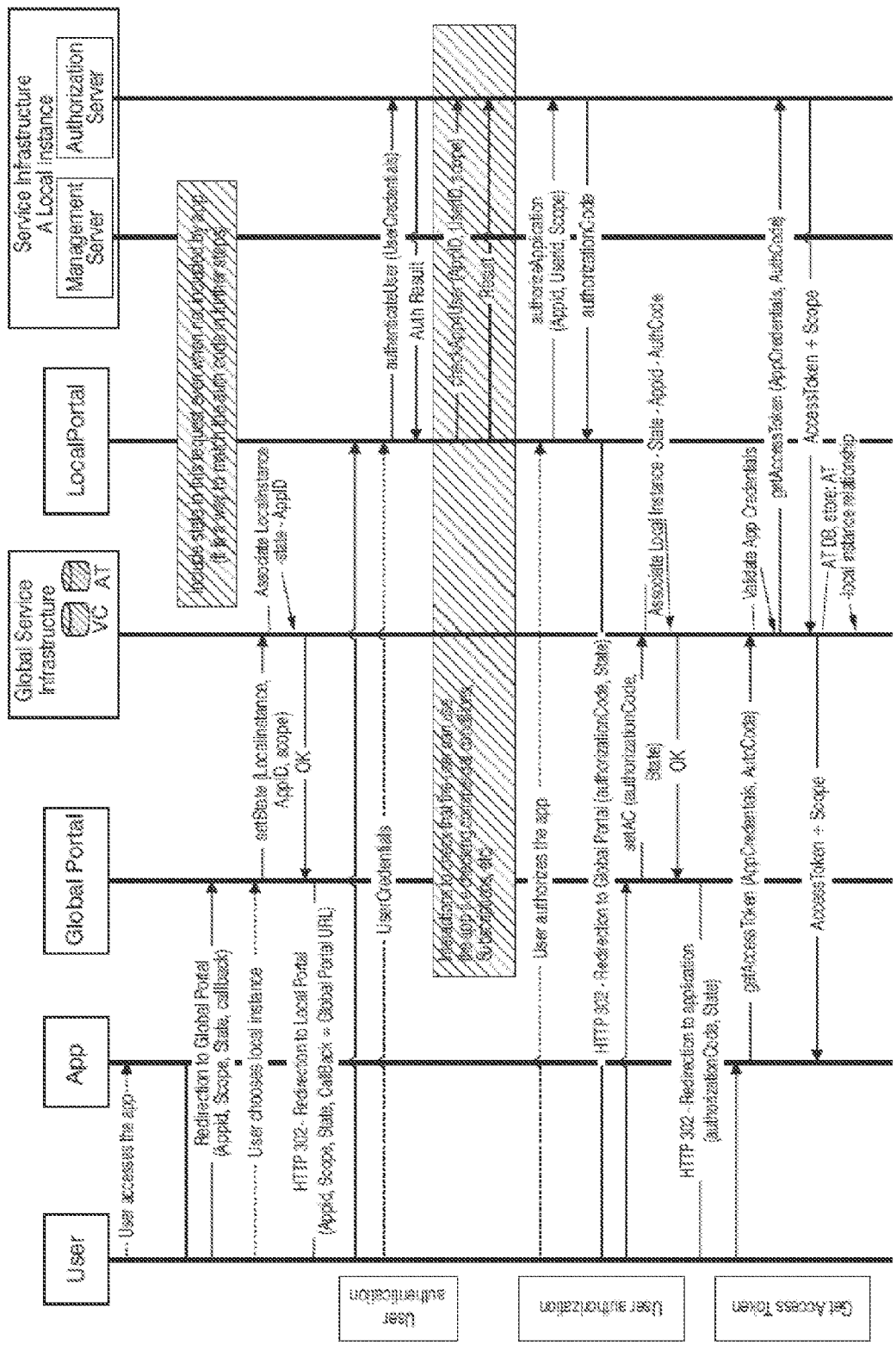
FIG. 11 shows the sequence to get an access token with OAuth 2.0, which does not require a request token, and each administrative domain has its own local web portal, according to an embodiment of the invention.

In OAuth 2.0, as shown in FIG. 11, the state is included by the global portal if not already included by the application. This is used to correlate the second redirection back from local portal, after user authorization.

Consuming a Protected Resource

Once the application has obtained an Access Token—which is issued by the user's service provider as explained above—in order to access a protected resource, the application's service request needs to target the user's resource server. Although the application is not aware of which resource server is associated to the user, the Access Token will help to find it out by the following alternatives:

Self-contained. The user's resource server is self-contained in the Access Token. In this case, there are two further possibilities:
1. The resource server information is encrypted to prevent the application (and third-parties) inferring information from the Access Token. This case is helpful if the user's resource server is considered as sensitive information.
2. The resource server information is available in clear text which simplifies the processing of the Access Token.

Directory-based. A directory of Access Tokens associates each Access Token with a resource server.

As a result, the routing to the appropriate resource server is based on the Access Token. Two different approaches are considered:

Proxy mode. A proxy will intermediate between the application and the resource server. The proxy takes the responsibility of routing the application's service requests to the user's resource server based on the Access Token.

Redirector mode. The application retrieves the resource server endpoint from a directory of Access Tokens. Then the application has to compose the URL to access the protected resource in the user's resource server.

Figure 12:
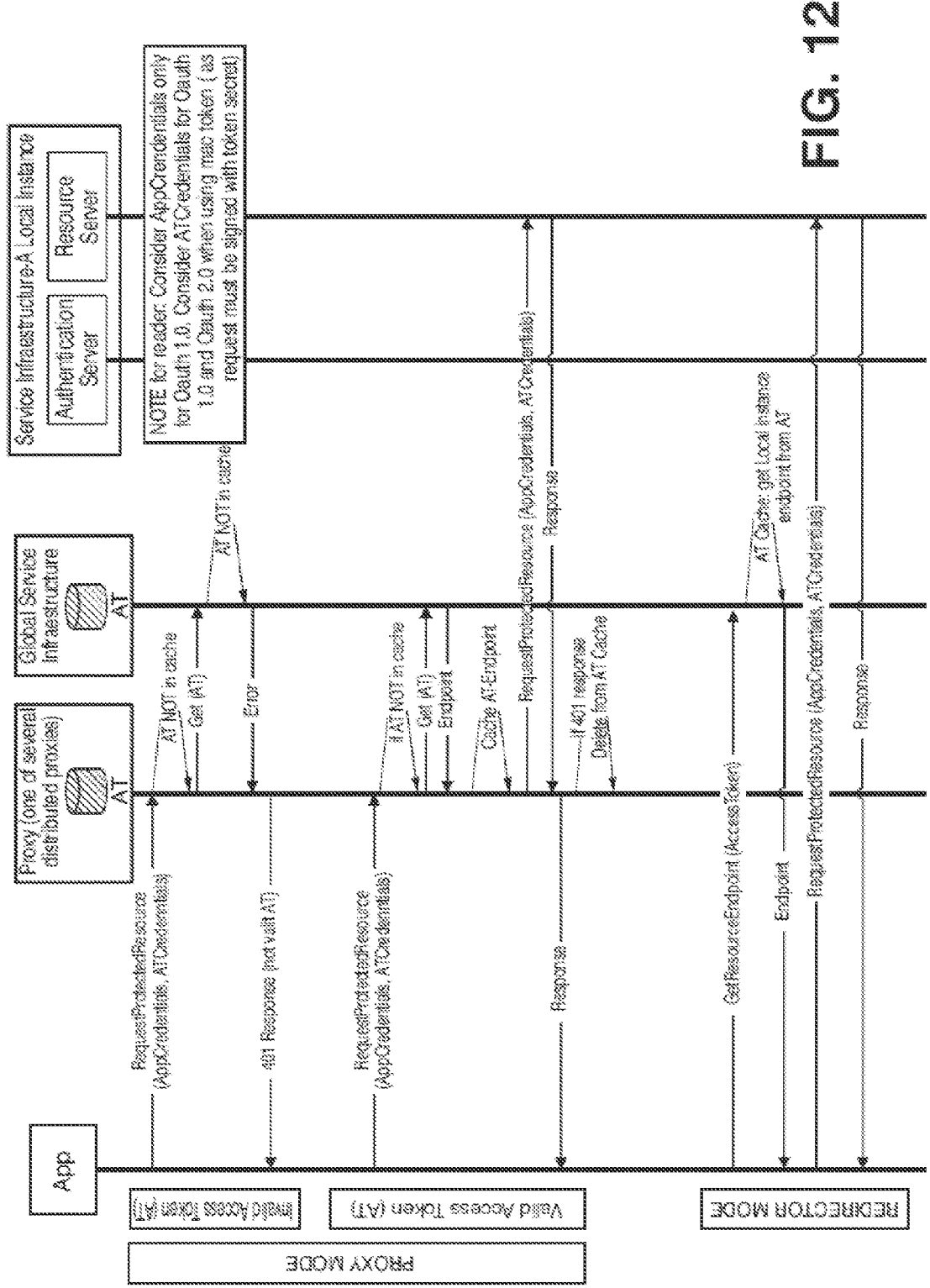
FIG. 12 shows the sequence diagram when consuming a protected resource in both proxy mode and redirector mode, according to an embodiment of the invention.

The proxy mode has two advantages: a) the URL is unique; the same URL is valid to access the same protected resource in every resource server, and b) the application is simplified because it is not aware of the redirection concerns. On the other hand, the main disadvantage of this mode is that an intermediary increases the response latency and might become a bottleneck, which could be relieved by replicating and distributing geographically several proxies. As shown in FIG. 12, the proxy mode is split into two use cases:

The application accesses with an invalid Access Token. The proxy tries unsuccessfully to resolve the Access Token by means of the global Access Token directory. The proxy will reply with an Unauthorized HTTP message.

The application uses a valid Access Token. The proxy tries to resolve the Access Token with its cache to speed up the routing. If the Access Token is not stored in the cache, the proxy attempts to resolve it by means of the global Access Token directory which would return the appropriate resource server saving this match temporarily in the cache for future requests. Finally, the resource would be accessed by the proxy.

The redirector mode is the most efficient approach because the application interacts directly with the appropriate resource server. However, the application logic is slightly more complicated because it needs to resolve the Access Token by means of the global Access Token directory, as shown in FIG. 12. The application would locally cache this mapping for further uses.

If the resource server endpoint is self-contained in the Access Token, the Access Token resolution could be performed in the global Access Token directory or directly in the proxy/application.

Revoking an Access Token

The user needs mechanisms to revoke the authorization to an application, which means revoking the Access Token. The local service infrastructure might also revoke an Access Token due to specific policies (e.g., an Access Token of only one use, once the application consumed it).

Figure 13:
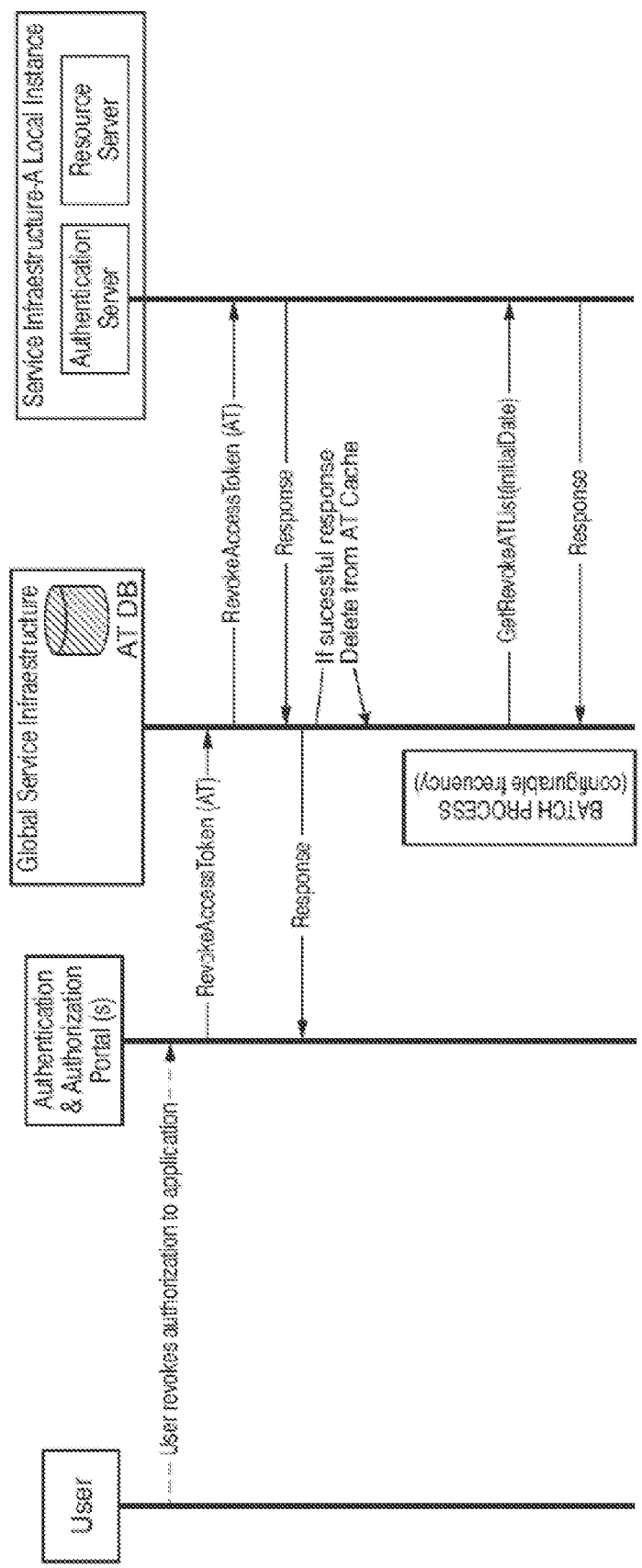
FIG. 13 shows the sequence diagram when revoking an access token, according to an embodiment of the invention.
Figure 14:
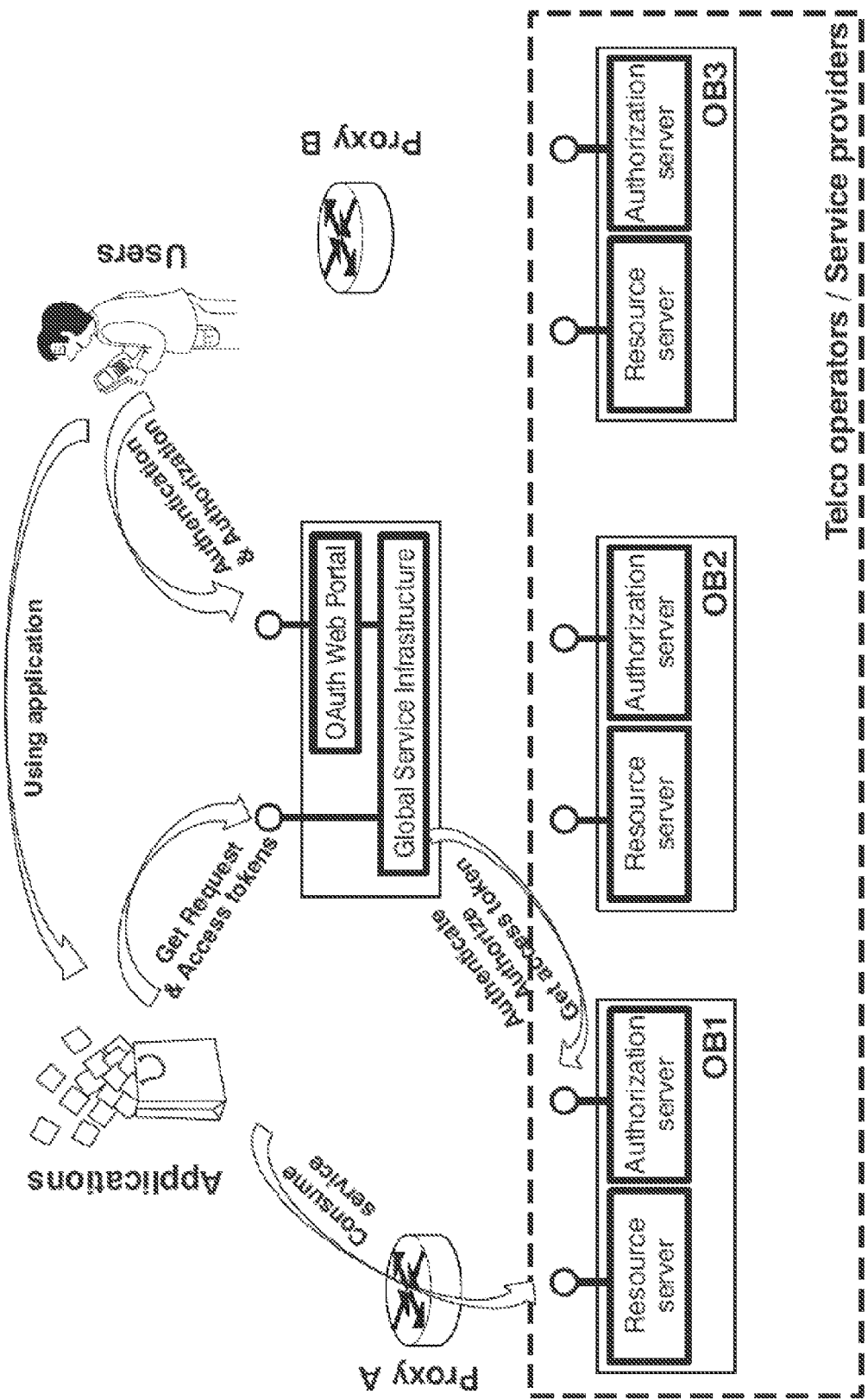
FIG. 14 shows several Operating Business (OBs) such as telco operators integrated into an application ecosystem.

The process to revoke an Access Token, as shown in FIG. 13, consists of:
1. The user enters into the global web portal to revoke the authorization to an application. The portal delegates this revocation to the global service infrastructure which intermediates with the appropriate local service infrastructure.
2. The local service infrastructure will revoke the Access Token, which was managed by the local authorization server. The global service infrastructure also removes the revoked Access Token from its cache.

Since that the revocation may also be made directly towards the local service infrastructure and since tokens may expire without having to be revoked, in order to have up-to-date information on valid Access Tokens at the global level, the global service infrastructure periodically retrieves the list of revoked Access Tokens from every local service infrastructure to update the Access Token cache. This synchronization is not time-critical, because there is no way to access the resources with an invalid Access Token, the synchronization just eliminates invalid entries from the global service infrastructure cache.

The telco operator market is the main focus of this invention. Each telco operator becomes the service provider and each user (or customer) belongs to an operator. Typically, an application market may offer applications built on top of the telco operator's services. However, the application developer would need to implement several variants of the same application to cover several telco operators unless the service interfaces, provided by each operator, are standardized.

The standardization of service interfaces will benefit the application developers because it broadens the market of potential users, the users as the number of applications is increased and their quality as well, and the telco operators because their revenue grows due to a higher number of transactions. All the actors involved in the use case profit from this approach.

Service providers (or telco operators) trust a higher, global entity for the authentication and authorization or provide a local web portal for such aim. The former case is valid if users trust this global entity with the same confidence than their telco operator.

However, other use cases cannot be based in this global entity. The Wholesale Application Community (WAC) [15] aims at setting up an application market valid for every operator and mobile phone. However, operators cannot open their users' information, which is vital for their business, to a different entity. The latter approach, where the authentication and authorization is performed locally, would serve to settle this constraint, and the users would profit from a broad set of applications which make use of telco services (for those services which have been standardized).

Advantages of the Invention

When compared against traditional approaches, Distributed OAuth presents several benefits, both for end-users and service providers. Some of them are highlighted next:

Scalability and performance. Distributed OAuth avoids the need to have a centralized infrastructure for issuing and enforcing the usage of Access Tokens, which in turn enables accessing APIs in a fully distributed manner. This implies a great enhancement in terms of scalability and performance, as the infrastructure can horizontally grow to address the demands of Internet-scale services. Bottlenecks can be avoided while keeping full control on the API access.

Boosting standard APIs. Distributed OAuth provides the required flexibility for different service providers to expose the same APIs while keeping their autonomy. As long as they adhere to standard OAuth and respect the requirements exposed in this document, service providers can freely implement their own local API access control mechanism (user authentication, access policies, etc) even when the APIs are going to be exposed jointly with other service providers in global scenarios. The overall operation of the system is satisfactory, while local implementations don't need to know anything about each other.

Simplified developer experience. Currently, developers need to know API endpoints before being able to access them. This fact complicates the above mentioned scenarios where there are several endpoints and different service providers, as developers need to cope with this diversity on their own.

Distributed OAuth maintains full compatibility with OAuth 1.0 or 2.0 standards and does not require any special behavior from the application side. Thanks to Distributed OAuth, developers will be able to access distributed APIs, potentially belonging to different service providers, just by following standard OAuth, without having to worry about the underlying diversity.

More precisely, the applications won't need to do anything especial when using the proxy mode, if the redirector mode is used, the application will need to consume the global Access Token directory service. This is the only addition to the "standard" operation on the application side.

A person skilled in the art could introduce changes and modifications in the embodiments described without departing from the scope of the invention as it is defined in the attached claims.

ACRONYMS

API Application Programming Interface
HTTP HyperText Transfer Protocol
IETF Internet Engineering Task Force
REST Representational State Transfer
SDP Service Delivery Platform
SOAP Simple Object Access Protocol
URL Uniform Resource Locator

REFERENCES

[1] OAuth 1.0, http://tools.ietf.org/html/rfc5849
[2] OAuth 2.0, http://tools.ietf.org/html/draft-ietf-oauth-v2-22
[3] http://www.sitepen.com/blog/2009/02/19/introducing-oauth-in-dojox/
[4] BlueVia developers OAuth guides, https://bluevia.com/en/knowledge/APIs.API-Guides.OAuth
[5] Twitter developers information, http://dev.twitter.com/pages/auth
[6] Google information on OAuth, http://code.google.com/p/oauth/
[7] Yahoo developers oauth information, http://developer.yahoo.com/oauth/
[8] Facebook developer information http://developers.facebook.com/docs/authentication/
[9] Google information on OAuth 2.0, http://code.google.com/intl/es-ES/apis/accounts/docs/OAuth2.html
[10] Federated Login for Google Account Users, http://code.google.com/intl/es-ES/apis/accounts/docs/OpenID.html
[11] OpenID OAuth Extension, http://step2.googlecode.com/svn/spec/openid_oauth_extension/latest/openid_oauth_extension.html
[12] Microsoft Session Directory Services Token Redirection Support in the Cisco Content Switching Module for the Cisco Catalyst 6500, http://www.cisco.com/en/US/prod/collateral/modules/ps2706/ps780/product_solution_overview0900aecd806fc547.pdf
[13] About IP Address and Token Redirection, http://technet.microsoft.com/en-us/library/cc732852.aspx
[14] NexTransit™ Interconnect Proxy, http://www.transnexus.com/Products/NexTransit.htm
[15] WAC—Wholesale Application Community, http://www.wacapps.net

The invention claimed is:

1. A method for providing authorized access to a service application in order to use a protected resource of an end user, said protected resource being exposed in OAuth protocol protected endpoints of a plurality of administrative domains, each administrative domain within said plurality of administrative domains belonging to a service provider and being responsible for individually issuing and controlling later use of authorizations to access to multiple protected resources, as granted by said end user belonging to said administrative domain, wherein said endpoints of said plurality of administrative domains are previously unknown by said service application, said method following standard performance of said OAuth protocol, and said method further comprising:

i. selecting, by an intermediate entity using a processor comprising:
   OAuth protocol endpoints, previously known or discovered by said service application and used by said service application to trigger an OAuth procedure; and
   an infrastructure which supports application registration and credentials management,
an administrative domain of said plurality of administrative domains based on information of said end user and preferences provided during OAuth authentication phase;
ii. routing, by said intermediate entity, said OAuth procedure to said selected administrative domain;
iii. performing, by said selected administrative domain, a secure authorization to grant access to said end user using an open protocol, said open protocol being said OAuth procedure comprising:
   an authentication phase of said end user; and
   providing said service application with an access token in order to allow access to said protected resource; and
iv. providing, said selected administrative domain to said service application, once performed said secure authorization, direct or proxy access to said protected resource via one of said endpoints established by said intermediate entity, said intermediate entity routing API authorized requests, sent by said application to said administrative domain, based on said access token,
wherein said open protocol is OAuth 2.0, and
wherein said OAuth 2.0 procedure further comprises:
   forwarding said end user to said links page in order to find out said administrative domain;
   said intermediate entity using said information of said end user to find said appropriate administrative domain and forwarding said end user to an appropriate common or local web or wap page accordingly;
   said end user providing credentials, when not being pre-authenticated, in said common or local web or wap page in order to perform said authentication phase;
   said common or local web or wap page forwarding an authentication request to an authorization server of said administrative domain with said credentials;
   said end user authorizing said application to access to said protected resource;
   said authorization server generating an authorization code or an access token and sending said authorization code or said access token to said service application via said intermediate entity;
   said application requesting and getting said access token via said intermediate entity in case of receiving said authorization code, wherein said intermediate entity gets an access token from said administrative domain; and
   said application using said access token to gain access to said protected resource.

2. The method according to claim 1, further comprising managing interaction between said intermediate entity and said end user using a links page.

3. The method according to claim 1, further comprising using said access token as a pointer to a routing decision taken during said authentication phase and providing, said intermediate entity, a data base which associates an access token to an administrative domain of said plurality of administrative domains.

4. The method according to claim 3, further comprising performing said routing of said API authorized requests using a redirection which provides to said application an administrative domain Uniform Resource Locator (URL) based on said access token querying said data base, wherein said application then accesses said protected resource with said administrative domain URL and a path to said protected resource.

5. The method according to claim 4, further comprising performing said routing of said API authorized requests using a proxy which extracts said access token and obtains said API endpoint associated to said access token from said intermediate infrastructure.

6. The method according to claim 1, wherein said plurality of administrative domains use a common web or wap page which allows interaction with the end user in order to perform at least part of said authentication phase.

7. The method according to claim 1, wherein each of said plurality of administrative domains uses a local web or wap page which allows interaction with the end user in order to perform at least part of said authentication phase.

8. The method according to claim 1, further comprising said authorization server revoking said access token on demand of said end user or revoking said access token according to specific policies of said API.

9. The method according to claim 8, further comprising said end user requesting said revoking of said access token to said common or local page and forwarding said request to said authorization server of said administrative domain via said intermediate entity.

10. The method according to claim 8, wherein said intermediate entity periodically retrieves a list of revoked access tokens from said API endpoints.

11. A method for providing authorized access to a service application in order to use a protected resource of an end user, said protected resource being exposed in OAuth protocol protected endpoints of a plurality of administrative domains, each administrative domain within said plurality of administrative domains belonging to a service provider and being responsible for individually issuing and controlling later use of authorizations to access to multiple protected resources, as granted by said end user belonging to said administrative domain, wherein said endpoints of said plurality of administrative domains are previously unknown by said service application, said method following standard performance of said OAuth protocol, and said method further comprising:
  i. selecting, by an intermediate entity using a processor comprising:
    OAuth protocol endpoints, previously known or discovered by said service application and used by said service application to trigger an OAuth procedure; and
    an infrastructure which supports application registration and credentials management,
    an administrative domain of said plurality of administrative domains based on information of said end user and preferences provided during OAuth authentication phase;
  ii. routing, by said intermediate entity, said OAuth procedure to said selected administrative domain;
  iii. performing, by said selected administrative domain, a secure authorization to grant access to said end user using an open protocol, said open protocol being said OAuth procedure comprising:
    an authentication phase of said end user; and
    providing said service application with an access token in order to allow access to said protected resource; and
  iv. providing, said selected administrative domain to said service application, once performed said secure authorization, direct or proxy access to said protected resource via one of said endpoints established by said intermediate entity, said intermediate entity routing API authorized requests, sent by said application to said administrative domain, based on said access token,
wherein said open protocol is OAuth 1.0, which comprises granting a request token to said application, said request token being used to ask said end user to authorize to said application to access to said API, performed during said authentication phase,
wherein said service application gets said request token from said intermediate entity,
wherein said access token is used as a pointer to a routing decision taken during said authentication phase and said intermediate entity is provided a data base which associates an access token to an administrative domain of said plurality of administrative domains;
wherein said OAuth procedure further comprises:
  said application getting said request token;
  forwarding said end user to said links page in order to find out said administrative domain;
  said intermediate entity using said information of said end user to find said administrative domain and forwarding said end user to a corresponding common or local web or wap page accordingly;
  said end user providing credentials, when not being pre-authenticated, to said common or local web or wap page in order to perform said authentication phase;
  said common or local web or wap page forwarding an authentication request to an authorization server of said administrative domain with said credentials;
  said end user authorizing said application to access to said protected resource;
  said authorization server of said administrative domain generating an authorization code and sending it to said application via said intermediate entity;
  said application requesting and getting said access token via said intermediate entity, which gets an access token from said administrative domain; and
  said application using said access token to gain access to said protected resource.

12. A method as per claim 11, comprising, said intermediate entity, getting said request token from said administrative domain or setting said request token into said administrative domain.

* * * * *